BIDIRECTIONAL MULTIPLEX TRANSISTOR COMMUNICATION APPARATUS

Filed May 6, 1957

WITNESSES:

Bernard R. Gieguey

Leon J. Taga

INVENTORS
Leo Lawsine, Donald A. McIver
and John W. Taylor, Jr.
BY Maury I. Hull
ATTORNEY United States Patent Office 2,980,769

Patented Apr. 18, 1961

2,980,769

BIDIRECTIONAL MULTIPLEX TRANSISTOR COMMUNICATION APPARATUS

Leo Lawsine, Washington, D.C., and Donald A. McIver and John W. Taylor, Jr., Baltimore, Md., assignors to Westinghouse Electric Corporation, East Pittsburgh, Pa., a corporation of Pennsylvania Filed May 6, 1957, Ser. No. 657,358

2 Claims. (Cl. 179—170)

This invention relates to bilateral or bidirectional multiplex communication apparatus, and more particularly to bidirectional apparatus employing transistors for the simultaneous transmission of two signals in two directions.

Prior are bidirectional systems for the simultaneous transmission of signals in opposite directions are usually characterized by a number of disadvantages. For example, some bidirectional prior art devices require complicated filters in the circuit; others employing transistors have necessitated the use of specially constructed transistor or other semiconductor devices not commercially available.

The apparatus of the instant invention overcomes these and other disadvantages of the prior art by employing a pair of conventional transistor triodes suitably connected in circuit with a source of alternating-current potential of switching frequency several times higher than the highest audio or intelligence frequency to be transmitted. The voltage of switching frequency actuates a communication channel in one direction during one alternation of the switching voltage and actuates a communication channel in the opposite direction during the next alternation of the switching voltage.

Accordingly, a primary object of the instant invention is to provide new and improved bidirectional communication apparatus.

Another object is to provide new and improved bidirectional communication apparatus employing transistor devices.

A further object is to provide new and improved transistor apparatus for the simultaneous transmission of two signals in two directions.

Still a further object is to provide new and improved apparatus employing transistors for the simultaneous transmission of two-voice or other audio frequencies in two directions.

Other objects and advantages will become apparent after a perusal of the following specifications when read in connection with the accompanying drawings, in which.

Figure 1:
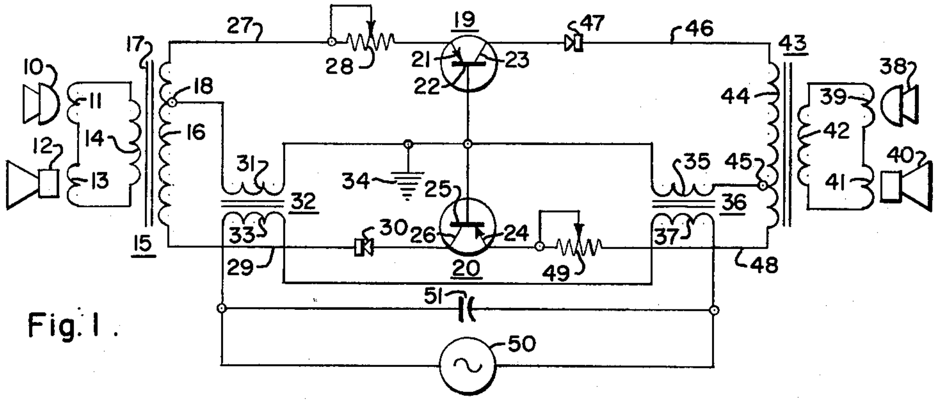
Figure 1 is a schematic electrical circuit diagram of the bidirectional apparatus constructed according to the preferred embodiment thereof.

Particular attention is now directed to the drawings in which like reference numerals are used throughout to designate like parts, and in particular to Fig. 1 thereof. There is shown at 10 a microphone which may be of the dynamic type having a voice coil 11 in which currents of voice frequencies are induced. There is shown at 12 a loud-speaker or other transducer which may be of the permanent magnet type having energizing coil 13. Microphone 10 and speaker 12 are located at a first communication station. Coils 11 and 13 are connected together and are connected to the winding 14 of a transformer generally designated 15 having an additional winding 16, the transformer 15 being of the audio frequency type and preferably having a magnetic core 17. Winding 16 has a tap 18 which is provided for purposes to be made hereinafter more clearly apparent.

There are shown at 19 and 20 a pair of similar triode transistors, transistor 19 having an emitter 21, base 22 and collector 23, transistor 20 having an emitter 24, base 25 and collector 26. The upper terminal, as shown in Fig. 1, of the aforementioned winding 16 is connected by way of lead 27 and variable resistor 28 to the aforementioned emitter 21. The other or lower terminal of winding 16 is connected by way of lead 29 and a rectifier 30 which may be of any convenient design, for example, a diode, to the aforementioned collector 26 of transistor 20. The aforementioned tap 18 of winding 16 is connected to one terminal of the secondary 31 of a transformer generally designated 32 and having a primary winding 33, the transformer 32 being provided for purposes to be made hereinafter more clearly apparent. The other terminal of the secondary 31 is connected to ground 34 and to both of the aforementioned bases 22 and 25 of transistors 19 and 20 respectively. The aforementioned bases 22 and 25 and ground 34 are also connected to one terminal of the secondary 35 of an additional transformer generally designated 36 having a primary 37 and provided for purposes to be made hereinafter more clearly apparent.

Disposed at the other or second communication station are a microphone 38 having a voice coil 39 and a loudspeaker or other transducer 40 having a coil 41. Coils 39 and 41 are connected in series and thence to winding 42 of a transformer generally designated 43 having an additional winding 44 which has a tap 45. The other terminal of the aforementioned secondary 35 of aforementioned transformer 36 is connected to tap 45. The upper end of winding 44, as viewed in Fig. 1, is connected by way of lead 46 and a rectifier 47 which may be a diode to the aforementioned collecter 23 of transistor triode 19. The lower terminal of winding 44, as seen in Fig. 1, is connected by way of lead 48 and a variable resistor 49 to the aforementioned emitter 24 of transistor 20.

As aforementioned, simultaneous transmission of two signals in two directions is accomplished by employing a switching frequency greater than, and preferably at least several times as great as, the highest audio frequency to be transmitted. There is shown at 50 a source of alternating-current potential of switching frequency, for example 50 kilocycles per second, the source 50 being of any convenient design and providing any suitable wave form which may be either a pulse or sine wave. Preferably, the generator 50 has a capacitor 51 connected thereacross and the aforementioned primaries 33 and 37 are connected in series across the generator 50.

In the operation of the above-described apparatus of Fig. 1, each of the transistors 19 and 20 serves alternately as a transmission channel for the communication signal, transistor 19 providing for passage of a signal from left to right, that is, from microphone 10 to loud-speaker 40, and transistor 20 providing for passage of a communication signal from right to left, that is, from microphone 38 to loud-speaker 12. While unit 19 is transmitting, the transistor unit 20 is cut off for reasons to be hereinafter made more clearly apparent, and while the transistor unit 20 is operative to transmit the signal from right to left, the aforementioned transistor 19 is cut off. The aforementioned alternating-current generator 50 produces across the aforementioned secondaries 31 and 35 an alternating-current voltage of the same frequency as the frequency generated at 50. Assume now by way of description, that during a first alternation of the voltage of generator 50, the tap 18 of winding 16 has a positive voltage applied thereto from secondary 31 of transformer 32 and the tap 45 of winding 44 has a negative voltage applied thereto from secondary 35 of transformer 36. At this moment, a positive potential is applied to the emitter 21 and a negative potential applied through rectifier 47 to the aforementioned collector 23. These potentials are of the correct polarity to provide for the operation of transistor 19 to conduct or amplify signals applied thereto. The voltage of audio frequency generated by microphone 10 is stepped down by transformer 17 because of the relatively small portion of winding 16 between the upper terminal thereof and tap 18 and applied to the relatively low impedance input circuit of the transistor 19 comprising the emitter 21 and base 22. It will be noted that the collector current of collector 23 flows through a large portion of the winding 44 between the upper terminal thereof and tap 45 so that the relatively high transistor output impedance between collector 23 and base 22 is matched to the impedance of the loud-speaker 40 having coil 41. Accordingly, the voice frequencies generated in microphone 10 are passed during the first alternation of the voltage from generator 50 by way of transistor 19 to the transducer 40.

During the next alternation of the voltage from generator 50, tap 18 of winding 16 has a negative voltage applied thereto from secondary 31 while tap 45 of winding 44 has a positive voltage applied thereto from secondary 35. As is well known in the art, a triode junction transistor is adapted to readily conduct while the emitter thereof is biased in a forward direction, but is rendered substantially non-conductive when the emitter thereof is biased in a reverse direction. The negative potential at tap 18, during the second alternation of the voltage from generator 50, applies a negative potential to the aforementioned emitter 21 of transistor triode 19 with the result that triode 19 is rendered substantially inoperative. The aforementioned rectifier 47 is of such a polarity that the positive voltage on tap 45 does not result in the flow of substantial collector current in collector 23. However, the positive voltage on tap 45 is applied by way of lead 48 and variable resistor 49 to the emitter 24 of the triode transistor 20 with the result that the transistor 20 is rendered operative to amplify voice currents applied thereto and these currents are applied by way of rectifier 30 in lead 29 to a portion of the winding 16 and are thence applied by way of winding 14 to the coil 13 of loud-speaker 12. Accordingly, during the alternation of voltage from generator 50 which renders tap 45 positive with respect to ground 34, the voice currents originating at microphone 38 are transmitted through transistor 20 in a right-left direction to the aforementioned loud-speaker or other transducer 12. During the third alternation of voltage from generator 50 the process again reverses itself, transistor 19 becoming operative to pass currents from microphone 10 to loud-speaker 40. During this third alternation it will be noted also that the aforementioned rectifier 30 is of such a polarity as to prevent the flow of substantial collector current in the triode transistor 20.

There is provided then, a circuit in Fig. 1 admirably suited to accomplish the aforedescribed objects of the invention. By the use of a suitable frequency at generator 50, any loss in intelligibility may be substantially eliminated or reduced to a minimum. Because the left-right and right-left channels are selectively energized at alternate times, the possibility of feedback is reduced to a minimum. The aforementioned resistors 28 and 49 serve to limit the emitter currents of emitters 21 and 24 respectively, and may be adjusted to stabilize the operating points of the respective transistors.

Figure 2:
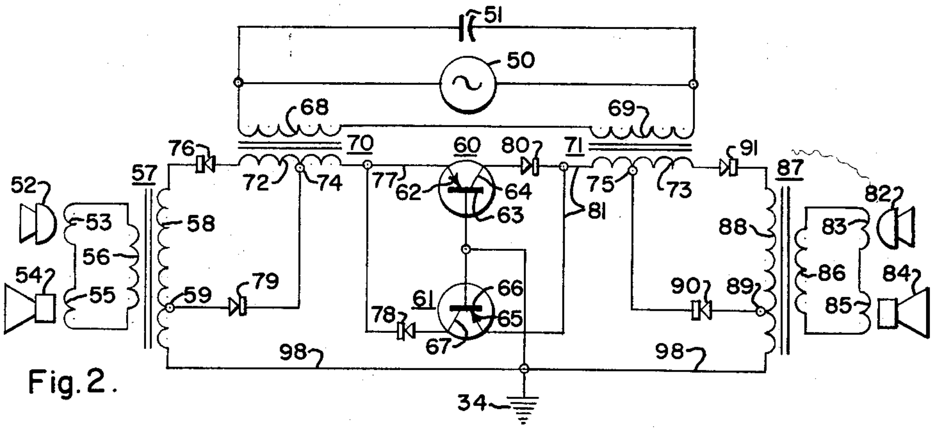
Fig. 2 is an electrical circuit diagram of a modification of the apparatus of Fig. 1.

Particular attention should be paid now to Fig. 2, in which there is shown a modification of the apparatus of Fig. 1. At one communication station, a microphone 52 having a coil 53 is associated with the loud-speaker 54 having a coil 55, and the coils 53 and 55 are connected in series to one winding 6 of the transformer generally designated 57 having an additional winding 58 with a tap 59. A pair of substantially similar triode transistors 60 and 61 are provided, transistor 60 having an emitter 62, base 63 and collector 64, transistor 61 having an emitter 65, base 66 and collector 67.

The generator 50 having capacitor 51 connected thereacross energizes the primaries 68 and 69 of a pair of transformers generally designated 70 and 71, respectively, having tapped secondaries 72 and 73, respectively, with taps 74 and 75, respectively. The upper terminal of winding 58 of transformer 57 is connected by way of rectifier 76, the full secondary 72, and lead 77 to the aforementioned emitter 62. Lead 77 is also connected by way of rectifier 78 to the aforementioned collector 67 of transistor 61. The aforementioned tap 59 of winding 58 is connected by way of rectifier 79 to the aforementioned tap 74 of winding 72. The lower end of the aforementioned winding 58 of transformer 57 is connected by way of lead 98 to ground 34 and also to both of the aforementioned bases 63 and 66 of transistors 60 and 61 respectively. The aforementioned collector 64 of transistor 60 is connected by way of rectifier 80 and lead 81 to one terminal of the aforementioned secondary 73 of transformer 71. Lead 81 is also connected to the aforementioned emitter 65 of transistor 61.

At the other or second communication station employing the apparatus of Fig. 2, there is located a microphone 82 having coil 83 and a loud-speaker or other transducer 84 having coil 85. Coils 83 and 85 are connected in series and to one winding 86 of a transformer generally designated 87 having an additional winding 88, winding 88 having tap 89. Tap 89 of winding 88 is connected by way of rectifier 90 to the aforementioned tap 75 of secondary 73. The upper terminal of winding 88 is connected by way of rectifier 91 to the other terminal of the aforementioned secondary winding 73. The lower terminal of the winding 88 is connected to the aforementioned lead 98.

In the operation of the above-described apparatus of Fig. 2, assume by way of description, that during the first alternation of the voltage of the frequency generated by generator 50 induced in the secondaries 72 and 73 of the transformers 70 and 71 respectively, that the lead 77 has a positive potential applied thereto from secondary 72 and the aforementioned lead 81 has a negative potential applied thereto from secondary 73. The aforementioned rectifier 78 is of such a polarity as to prevent substantial collector current in the transistor 61, but the same positive potential on lead 77 is applied to the emitter 62 of transistor 60 rendering the transistor 60 operative or conductive. The input circuit of transistor 60 is completed from lead 77 through a portion of the secondary 72 to tap 74, rectifier 79, tap 59, a portion of winding 58 and lead 98, back to the base 63. The output circuit of transistor 60 is completed during this alternation of voltage from generator 50, through rectifier 80, secondary 73, rectifier 91, the entire winding 88 and leads 98, back to the base 63. As a result, during this alternation of the voltage from generator 50, voice currents generated in microphone 52 are transmitted in a left-right direction by way of transistor 60 to the loud-speaker 84 located at the other communication station. It should be noted that the polarities of the rectifiers 79, 80 and 91 are correct for the operation of the signal amplifier including transistor 60 in a left-right direction. During the same alternation, it should be noted that tap 74 of winding 72 is positive with respect to the left-hand end of the secondary 72 and that the polarities of the rectifiers 76 and 79 are such that the flow of current in the loop comprising the left-hand portion of secondary 72 and the upper portion of winding 58 is discouraged. As in the operation of the apparatus of Fig. 1, the impedance of microphone 52 may be substantially matched to the low input impedance of the emitter-base input circuit of transistor 60 by a suitable choice of tap position for the tap 59. Likewise, the relatively high collector-base impedance of the transistor 60 is matched by the full winding 88 and winding 86 of transformer 87 to the impedance of the loud-speaker coil 85.

During the next alternation or half-cycle of the voltage from the generator 50 of Fig. 2, the polarities of the voltages in secondaries 72 and 73 are reversed, so that it will be assumed by way of description, that during this half-cycle or alternation there is applied a negative potential on the lead 77 and a positive potential on the lead 81. The tap 75 of secondary 73 is then negative with respect to lead 81 and the aforementioned rectifier 90 is of such a polarity as to complete the input circuit to transistor 61 from emitter 65 by way of lead 81, a portion of secondary 73, tap 75, rectifier 90, tap 89, a portion of winding 88 and lead 98, back to the base 66. The positive potential on emitter 65 causes the transistor 61 to become conductive so that voice current originating in the microphone 82 are transmitted in a right-left direction through the transistor 61. The output circuit of the transistor 61 is completed by way of collector 67, rectifier 78, lead 77, secondary 72, rectifier 76, winding 58 and leads 98, back to the base 66. Accordingly, amplified voice currents originating in microphone 82 are transferred through transformer 57 to the loud-speaker 54. The polarities of rectifiers 90 and 91 are such that substantial current does not flow in the unused portion of winding 88 during this alternation.

As before, as described in connection with the apparatus of Fig. 1, the rectifiers 78 and 80 of Fig. 2 prevent substantial collector currents flowing in collectors 67 and 64, respectively, during those alternations when the respective transistors 61 and 60 are not performing any useful functions.

Figure 3:
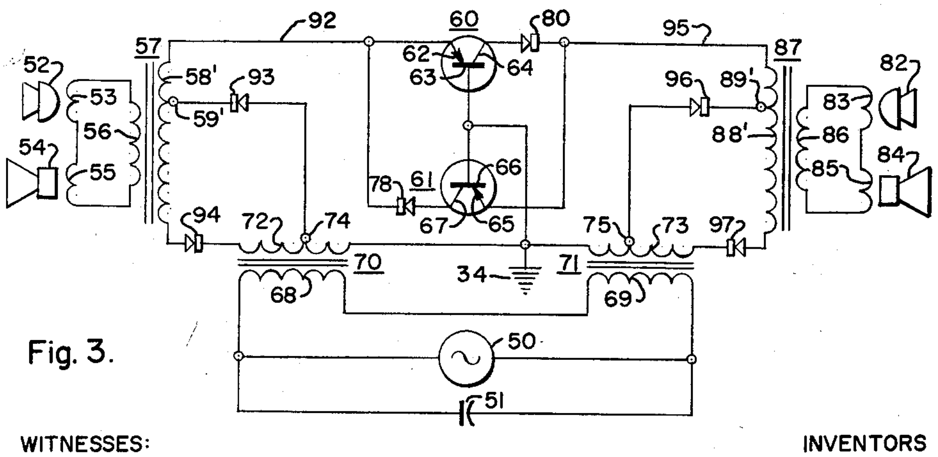
Fig. 3 is an additional modification of the apparatus of Fig. 1.

Particular reference should be made now to Fig. 3, in which a third embodiment of the invention and modification of the apparatus of Fig. 1 as shown. The circuit of Fig. 3 is somewhat similar to the circuit of Fig. 2, except that, as will be noted, the switching voltages are applied in Fig. 3 in the leads to the bases 63 and 66 of transistors 60 and 61. Transformer 57 has a winding 58' with a tap 59', the upper terminal of winding 58' being connected by way of lead 92 to emitter 62 and rectifier 78. Tap 74 is connected by way of rectifier 93 to the aforementioned tap 59'. It will be noted that the rectifier 93 is reversed in polarity from the corresponding rectifier 79 of Fig. 2. In Fig. 3, the secondary 72 has one end thereof connected to ground 34 and the other end or terminal thereof connected by way of rectifier 94 to the other terminal of winding 58'. It will be noted that the polarity of rectifier 94 is reversed from that of the corresponding rectifier 76 of Fig. 2.

At the right-hand end of the apparatus of Fig. 3, transformer 87 is shown to have a winding 88' with a tap 89'. The upper terminal of winding 88' is connected by way of lead 95 to the aforementioned rectifier 80 and also to emitter 65. The aforementioned tap 89' is connected by way of rectifier 96 to the aforementioned tap 75 of secondary 73. It should be noted that the rectifier 96 has a polarity opposite to that of the corresponding rectifier 90 of Fig. 2. In Fig. 3, the lower end of winding 88' is connected by way of rectifier 97 to the adjacent end of the secondary 73. It will be noted that the rectifier 97 has a polarity which is reversed from that of the corresponding rectifier 91 of Fig. 2.

In the operation of the apparatus of Fig. 3, during a first alternation of the voltage from generator 50, let it be assumed that a positive voltage from secondary 72 is applied to rectifier 94 and the negative voltage to ground 34, and a positive voltage from secondary 73 is applied to ground 34 while a negative voltage from secondary 73 is applied to rectifier 97. The portion of secondary 72 between tap 74 and ground 34 applies a positive potential to rectifier 93 which is of a polarity to complete the input circuit to emitter 62 of transistor 60 rendering the transistor 60 conductive. At the same time, the rectifier 78 prevents the application of this positive potential to collector 67 thereby preventing substantial and useless collector current flow in transistor triode 61. At the same time, a negative potential developed at the right-hand end of secondary 73, as viewed in Fig. 3, is applied between base 63 and collector 64 by way of rectifier 97, which is of the correct polarity, winding 88' and rectifier 80, which are of the correct polarity, to complete the output circuit of transistor 60, the output circuit including as aforementioned the collector 64 and base 63. Accordingly, during the first alternation of the voltage from generator 50, voice currents are transmitted from voice coil 53 of microphone 52 at the left communication station by way of transistor 60 to the loud-speaker 84 at the right-hand communication station.

During the next alternation of voltage from generator 50, polarities in secondaries 72 and 73 are reversed with the result that a positive potential is applied from tap 75 by way of rectifier 96, the upper portion of winding 88' and lead 95 to emitter 65 rendering the triode 61 conductive. At the same time, the output circuit of the triode 61 is completed through rectifier 78, lead 92, winding 58', rectifier 94, winding 72, back to the base 66, with the result that voice currents originating in microphone 82 are transmitted in a right-left direction through triode transistor 61 to the loud-speaker 54. As before, rectifiers 78 and 80 prevent substantial collector currents in collectors 67 and 64, respectively, of transistors 61 and 60 respectively, during those alternations of the voltage from generator 50 in which the respective transistors are not active to conduct signal currents.

Either transistors of the P–N–P or N–P–N type may be employed, suitable choice of rectifier polarities being made.

The microphones and speakers at the respective communication station could, if desired, be combined in a single unit, for example, microphone 10 and speaker 12 of Fig. 1.

The transducer means at the two communication stations are to be considered as illustrations of signal utilization means or signal obtaining or transmitting means of any desired description.

The term "unilateral transistor" as employed in the claims appended hereto is defined as a transistor having a plurality of electrodes, at least some of which must have voltages of one predetermined polarity only applied thereto while substantial signal conduction is to take place through the transistor.

Whereas the invention has been shown and described with respect to three embodiments thereof which give satisfactory results, it will be understood that modifications may be made and equivalents substituted without departing from the spirit and scope of the invention.

We claim as our invention:

1. Bidirectional communication apparatus for simultaneously transmitting in opposite directions a pair of alternating current intelligence signals comprising, in combination: a first unilateral triode transistor having a first base, first emitter and first collector; a second unilateral triode transistor having a second base, second emitter and second collector; first and second intelligence signal obtaining means; first and second signal utilization means; first transformer means having a first primary and a first tapped secondary; second transformer means having a second primary and a second tapped secondary; circuit means connecting said first and second bases together; additional circuit means including additional transformer means connecting said first and second bases to the tap of said first secondary; further circuit means including further transformer means connecting said first and second bases to the tap of said second secondary; other circuit means operatively connecting said first emitter to one terminal of said first secondary; still other circuit means including first rectifier means connecting said first collector to one terminal of said second secondary; still further circuit means including second rectifier means connecting said second collector to the other terminal of said first secondary; supplemental circuit means operatively connecting said second emitter to the other terminal of said second secondary; means for obtaining an alternating current switching voltage having a frequency greater than the highest frequency in the intelligence signals to be transmitted and for applying said switching voltage to said additional transformer means and to said further transformer means to energize the same; adjunct circuit means connecting siad first signal obtaining means and said first signal utilization means to said first primary; and added circuit means connecting said second signal obtaining means and said second signal utilization means to said second primary.

2. Bidirectional communication apparatus for simultaneously transmitting in opposite directions a pair of alternating current intelligence signals comprising, in combination: first transformer means having a first primary and a first tapped secondary; transducer means operatively connected to said first primary; a first unilateral triode transistor having a first emitter, first base and first collector; a second unilateral triode transistor having a second emitter, second base and second collector; lead means operatively connecting said first emitter to one terminal of said first secondary; rectifier means operatively connecting said second collector to the other terminal of said first secondary; second transformer means including a second primary and a second tapped secondary; second transducer means connected to said second primary; second rectifier means connecting said first collector to one terminal of said second secondary; lead means connecting said second emitter to the other terminal of said second secondary; means for obtaining an alternating current voltage of predetermined frequency; third and fourth transformer means having said alternating current voltage of predetermined frequency applied thereto; circuit means connecting said first and second bases by way of said third transformer means to the tap of said first secondary; and other circuit means connecting said first and second bases by way of said fourth transformer means to the tap of said second secondary.

References Cited in the file of this patent

UNITED STATES PATENTS

| | | |
|---|---|---|
| 1,507,889 | Nicolson | Sept. 9, 1924 |
| 2,021,638 | Ramlau | Nov. 19, 1935 |
| 2,681,993 | Shockley | June 22, 1954 |
| 2,691,073 | Lowman | Oct. 5, 1954 |
| 2,810,081 | Elliott | Oct. 15, 1957 |
| 2,812,437 | Sziklai | Nov. 5, 1957 |
| 2,827,611 | Beck | Mar. 18, 1958 |